No. 725,488. PATENTED APR. 14, 1903.
M. SCHELL.
CAMERA.
APPLICATION FILED JULY 15, 1902.
NO MODEL. 2 SHEETS—SHEET 1.
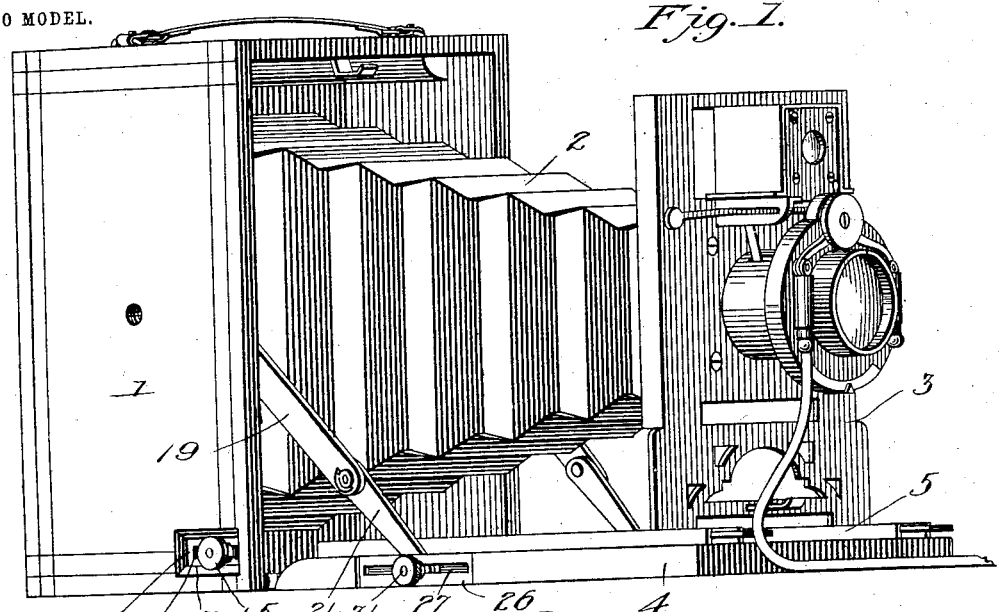
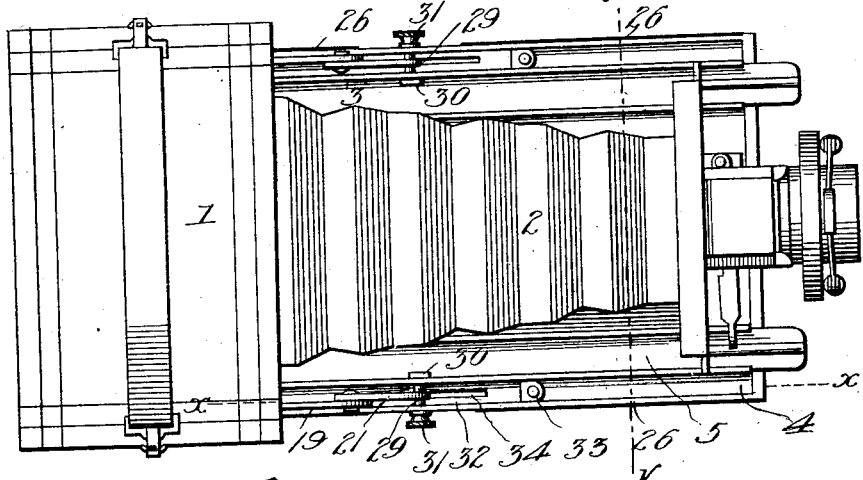
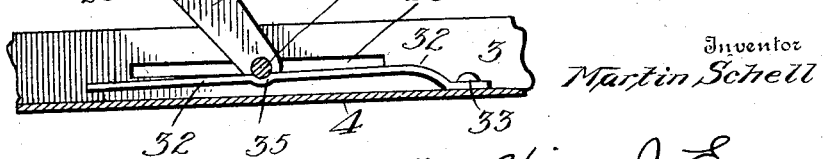
Witnesses
Edwin G. McKee
B. L. Dunk
Inventor
Martin Schell
By Victor J. Evans
Attorney No. 725,488. PATENTED APR. 14, 1903.
M. SCHELL.
CAMERA.
APPLICATION FILED JULY 15, 1902.
NO MODEL. 2 SHEETS—SHEET 2.
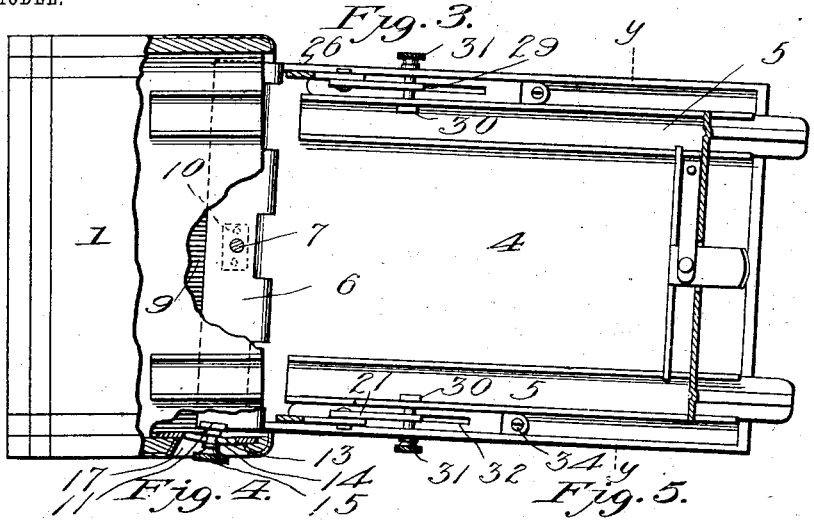
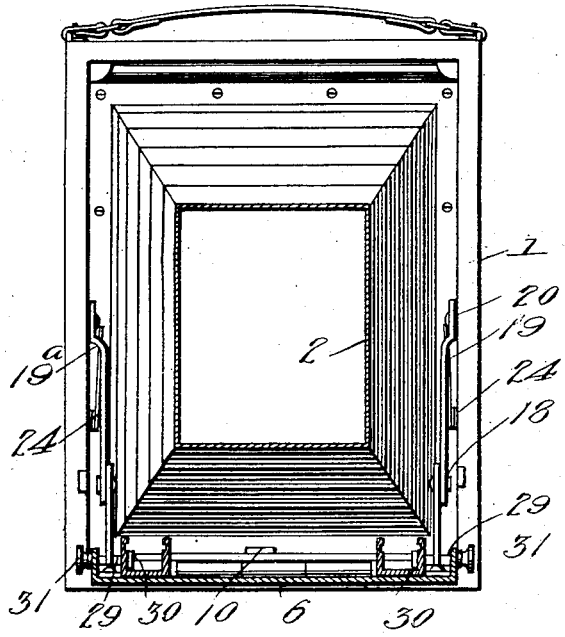
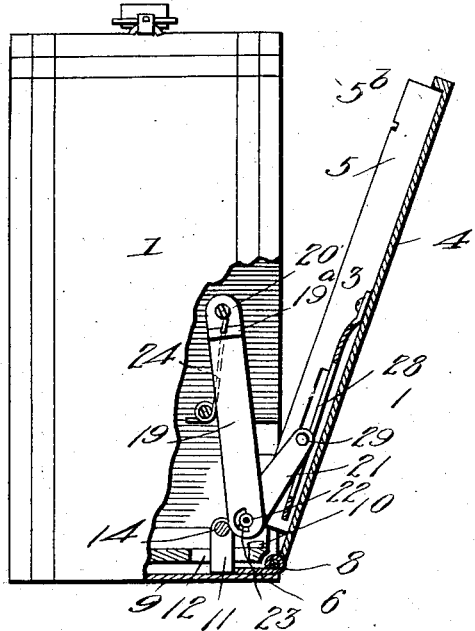
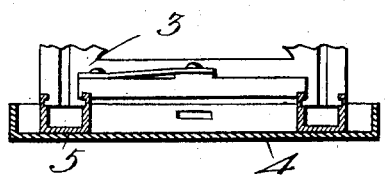
Witnesses
Edwin L. McKee
B. L. Punk
Inventor
Martin Schell
By Victor J. Evans
Attorney

UNITED STATES PATENT OFFICE.

MARTIN SCHELL, OF ROCHESTER, NEW YORK.

CAMERA.

SPECIFICATION forming part of Letters Patent No. 725,488, dated April 14, 1903.

Application filed July 15, 1902. Serial No. 115,730. (No model.)

*To all whom it may concern:*

Be it known that I, MARTIN SCHELL, a citizen of the United States, residing at Rochester, in the county of Monroe and State of New York, have invented new and useful Improvements in Cameras, of which the following is a specification.

This invention relates to improvements in cameras, and has especial relation to that type of camera in which the bed for supporting the camera-front in projected position is formed by the front of the inclosing case and is provided with guides for the travel and retention of the camera-front when the bed is swung into supporting position.

One object of the invention is to provide a camera of the above character, though not necessarily such, with a bed capable of lateral adjustment with relation to the camera-case, and especially to secure this relative lateral adjustment in addition to the vertical relative adjustment of these parts, so that by virtue of the combined adjustments the camera-front may be readily and conveniently directed to any point within a given circle of movement without the necessity of changing the position of the tripod.

The invention contemplates the attachment of the tripod to either the case or the bed, but preferably the case receives the tripod and is made the fixed member, as by such an arrangement of the parts the photographic plate is readily brought into the proper picture-plane and undisturbed by subsequent adjustments of the camera.

Another object of the invention is to provide means for supporting the bed at different inclinations by having an adjustable connection between the bed and case for the purpose, which will admit of the bed being swung to close the front of the case without requiring detachment of said means and which will be disposed in compact form within the case when said case is closed.

Another object is to provide for the independent adjustment of the bed-supporting means, whereby to admit of the lateral adjustment of the bed with relation to the case.

Another object is to provide the camera-front with automatic means for locking it in projected or other position upon the guides and also bring about the release of the said locking means and relieve it of engagement with the guides during the operation of moving the front upon the bed.

In the accompanying drawings, Figure 1 is a perspective view of a camera constructed in accordance with this invention, showing the camera-front projected. Fig. 2 is a top view of the camera in projected position. Fig. 3 is a top view in which the camera-bed is shown in a laterally-adjusted position, the camera-front and a part of the case being shown in horizontal section to disclose the locking means of the front and the construction by which the lateral adjustment of the bed is effected. Fig. 4 is a view in front elevation from which the camera-front has been eliminated by a section taken on line $v\ v$ of Fig. 2. Fig. 5 is a side view of the camera in which the bed is shown but partly swung away from the case, the bed and a portion of the case being shown by a section taken on the line $x\ x$ of Fig. 2. Fig. 6 is a transverse section view taken on the line $y\ y$ of Fig. 3, and showing only the lower portion of the camera-front. Fig. 7 is an enlarged detail view of a portion of the bed and one of the supports therefor.

Referring to the drawings, 1 indicates a shallow case of the character employed in the type of camera heretofore mentioned, in which said case forms the back of the camera and also receives and incloses the bellows 2 when collapsed and the camera-front 3, and 4 indicates the front of said case, which also constitutes a camera-bed, being provided with the usual runways or guides 5 for the camera-front.

To provide for the relative lateral movement of the bed 4 and also preserve the usual vertical movement thereof, this bed is hinged to a member 6, which is pivoted at 7 to the bottom of the case, adjacent the front edge thereof. This pivoted member consists, preferably, of a strip of metal formed after the manner of a hinge, the bed being formed or provided with a connecting edge to coöperate with the said strip, so that the bed and strip will be held pivotally together by a hinge-pin 8. The bottom of the case is suitably recessed on its under side to receive the pivoted plate 6 and admit of an oscillating movement thereof within necessary limits, and over this recessed portion is secured, so as to lie flush with the bottom of the case, a metal plate 9, which furnishes a durable mounting for the pivot 7 and a bearing for the plate 6 in its oscillating movement, while at the same time increasing the security of the support to said plate and holding it secure against movement in the direction of the hinge movement of the bed. A small plate 10 is located on the inner surface of the bottom of the case to receive the upper end of the pivot 7 and provide a durable support therefor.

In order to secure the pivoted plate 6 in its various adjustments, there is formed on one side thereof an upwardly-projecting arm 11, which extends into the case adjacent one of its sides through a slot 12, formed in the bottom of the case, of such length as to admit of the oscillating movement of the plate 6, and upon this arm there projects outwardly through a slot 13, formed in the side of the case, a screw-threaded extension 14, which receives a locking-nut 15 for binding the arm 11 to the side of the case, thereby securing the plate 6 in adjusted position. To receive the wear of these locking parts and the better secure the movement of the plate 6 upon slight turning of the nut to make the plate free for movement, there is provided a concave slotted plate 16, Fig. 3, on the inside of the case over the slot or opening 13, the curve of the concave surface of the plate conforming to the arc described by the arm 11 in its movement, so that but little movement of the nut will be required to draw the arm into binding contact therewith at any point. This nut may bear upon the opposite side of the plate 16 or a separate outer plate (not shown) may be provided for this purpose. As will be seen, a depression 17 is provided, so as to bring the binding-nut within the lines of the case.

The bed 4 is maintained in its vertical adjustments by the supports 18. These comprise each a main swinging member 19, pivoted to the case at 20, and a shorter member 21, pivoted to the main member at 22 and forming a link connection between it and the bed, which latter member when the bed is raised to close the case will fold upon the swinging member, as shown in Fig. 5. To limit the pivotal movement of the link member when said member becomes straight with the main member, either when extended or folded, said link member is provided with a stop 23, formed by an inturned projection on the end of said link member, which extends into a semicircular slot 23ª, formed about the pivot-aperture and on the main member.

To advance the supports 18 and thereby force the bed outward from its folded or closed position upon its releasing from the depressible latch shown, each support is provided with a spring 24, which is secured to the sides of the case adjacent the support, and has its arm held in sliding engagement with the support by extending through a perforation formed in a bend or offset 19ª of the support. The pressure of these springs is sufficient to force the bed into the position shown in Fig. 5 and from which it can be readily lowered.

The pivot 25, by which the link member 21 is connected with the bed, is mounted to slide back and forth on the bed for the purpose of the vertical adjustments of the bed, and also to adapt the supports 18 to a change of position independent of each other to accommodate at the same time the lateral adjustment of the bed, as shown by Fig. 3. In the present instance this sliding connection is attained by providing two parallel guides, which, as shown, are preferably formed by an inwardly-projecting flange 26, formed about the edge of the bed and the outer upstanding part of the adjacent guide 5, the said flange and said guide being provided with oppositely-disposed parallel slots 27 and 28, respectively, through which the sliding pivot 29 extends and forms and operates after the manner of a cross-head, the link member extending between the said guide members. This sliding pivot is provided with a bearing-head 30 on its inner end and is screw-threaded on its outer end to receive a nut 31, by which it may be secured to the guides in adjusted position.

Between the guides in which the pivot 29 has movement is located a spring 32, secured to the bed at 33 and adapted to bear upwardly at all times on the pivot for the purpose of furnishing a yielding bearing therefor, which will compensate for any wear of the parts and produce at all times a certain amount of friction, yet admit of the greatest freedom of movement of the sliding pivot. This spring is formed with a central slot 34, which receives the end of the support member 21 and serves to maintain the support in position centrally of the guides. A notch 35 to receive the pivot 29 is formed in the spring at a point at which the support will rest when the bed is in a horizontal position or when closed, so that a stop is thus provided whereby to facilitate bringing the pivot into its normal position in the guide and to hold it against accidental sliding from such position.

The guides or ways 5 for the camera-front employed in the present invention are two in number, each comprising a rectangular trough having on the inner side of its vertical portion and adjacent the upper edge thereof a groove 5ª, which receives and retains the side edge of the sliding foot portion 3ª of the front, two such sliding portions being employed in the present instance. Adjacent the said foot portion and on each side thereof the front is provided with an offset or shoulder 3ᵇ, which is adapted to overhang the upper edge of the guide and assist the guiding function thereof, Fig. 6.

The inner rails of the guide are each provided with a notch 5ᵇ, Fig. 5, near the forward ends and opposite each other, for the purpose of receiving the bar 36, by which the front may be locked against movement in its projected position. This bar rests upon the inner rail and is provided with a forwardly-projecting tongue 37, which being fulcrumed on the cross-bar 38 forms a lever for lifting the bar from engagement with the guides and at the same time forms a finger-hold for projecting or retracting the front. A pin 38 loosely secures the tongue to the cross-bar of the front, and a flat spring 39 is secured to the cross-bar, so as to bear upon the tongue 37 at a point in the rear of its fulcrum and normally hold the bar 36 in contact with the guide. In the operation of pulling out or pushing in the front a slight downward pressure on the tongue lifts the bar 36 free from the guide, while its release at any point assists by its contact with the guide to apply a friction to prevent the front from sliding too freely or becoming loose within the guide as by wearing of the parts.

What I claim is—

1. In a camera, the combination with the case, of a laterally-adjustable bed supported therefrom, substantially as and for the purpose set forth.

2. In a camera, the combination with the case, of a bed, and a connection between the case and bed, whereby to provide for a vertical and a lateral adjustment of the bed with relation to the case, substantially as and for the purpose set forth.

3. In a camera, the combination with the case, of a bed, and a laterally-oscillating member for said bed, having a hinge connection therewith, substantially as and for the purpose set forth.

4. In a camera, the combination with the case, of a bed having a hinge connection therewith, one or more swinging supports carried by the case, and having a pivotal and sliding connection with the bed, substantially as and for the purpose set forth.

5. In a camera, the combination with the case, of a bed, a connection between the case and bed, adapted to permit the bed to be adjusted vertically and laterally with relation to the case, and supports for the bed, adapted for independent adjustment to admit of the lateral adjustment of the bed, substantially as and for the purpose set forth.

6. In a camera, the combination with the case having a recess formed in one of its sides, of an oscillating member mounted within said recess, a bed hinged to said member, and means for supporting the bed adapted for adjustment, whereby to provide for the vertical and lateral adjustments of the bed, substantially as and for the purpose set forth.

7. In a camera, the combination with the case, of a bed, an oscillating connecting member for the bed, and means for securing said member in its various adjustments, substantially as and for the purpose set forth.

8. In a camera, the combination with the case, of a bed, an oscillating connecting member for the bed, an arm carried by said member, and means for clamping the said arm to the case at various points of its movement, substantially as and for the purpose set forth.

9. In a camera, the combination with the case, of a bed, a connecting member therefor, adapted to oscillate, an arm carried by said connecting member and projecting within the case, a slotted plate having a concave contact-face for said arm, secured over an opening in the side of the case, a projection from said arm extending through the slot of said plate, and a nut on the said projection for clamping the said arm to the plate, substantially as and for the purpose set forth.

10. In a camera, the combination with the case, of a swinging bed, and bed-supports carried by the case, each comprising a main swinging member and a link member, substantially as and for the purpose set forth.

11. In a camera, the combination with the case, of a swinging bed, bed-supports carried by the case, each comprising a main swinging member, and a link member connecting the same with the bed, and a spring for advancing the main member outward, substantially as and for the purpose set forth.

12. In a camera, the combination with the case, of a swinging bed having slotted guides, one or more sliding cross-heads within the slots of said guides, and a support for each cross-head, pivotally connected therewith and with the case, substantially as and for the purpose set forth.

13. In a camera, the combination with the case, of a swinging bed having guides thereon, one or more sliding cross-heads working within the guides, a support pivotally connected with each cross-head and with the case, and means for clamping the cross-heads to the guides in its various sliding adjustments thereon, substantially as and for the purpose set forth.

14. In a camera, the combination with the case, of a swinging bed having slotted guides, one or more sliding cross-heads within the slots of said guides, and a support for each cross-head, pivotally connected with the cross-head and with the case, and a yielding bearing for each cross-head, substantially as and for the purpose set forth.

15. In a camera, the combination with the case, of a swinging bed having slotted guides, one or more sliding cross-heads within the slots of said guides, and a support for each cross-head, pivotally connected with the cross-head and with the case, and a yielding bearing for each cross-head, having a retaining-notch for the cross-head, substantially as and for the purpose set forth.

In testimony whereof I affix my signature in presence of two witnesses.

MARTIN SCHELL.

Witnesses:
JOSEPH BODARZ,
JOSEPH MÜLLER.